United States Patent
Fukawa et al.

(10) Patent No.: US 7,210,828 B2
(45) Date of Patent: May 1, 2007

(54) VEHICLE LIGHTING SYSTEM

(75) Inventors: Kiyotaka Fukawa, Shizuoka (JP);
Tomoyuki Sakai, Shizuoka (JP);
Norihisa Sutou, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 78 days.

(21) Appl. No.: 11/076,403

(22) Filed: Mar. 9, 2005

(65) Prior Publication Data

US 2005/0201111 A1 Sep. 15, 2005

(30) Foreign Application Priority Data

Mar. 12, 2004 (JP) .......................... P. 2004-070108

(51) Int. Cl.
*B60Q 1/00* (2006.01)
*F21V 19/02* (2006.01)
*B60L 1/14* (2006.01)

(52) U.S. Cl. ...................... 362/465; 362/467; 362/523; 362/531; 307/10.8

(58) Field of Classification Search ................ 362/465, 362/531
See application file for complete search history.

(56) References Cited

U.S. PATENT DOCUMENTS

| | | | | |
|---|---|---|---|---|
| 5,404,278 A | * | 4/1995 | Shibata et al. ............... | 362/464 |
| 6,293,686 B1 | * | 9/2001 | Hayami et al. ............. | 362/465 |
| 6,481,876 B2 | * | 11/2002 | Hayami et al. ............. | 362/464 |
| 6,609,817 B2 | * | 8/2003 | Niwa et al. .................. | 362/466 |
| 7,118,238 B2 | * | 10/2006 | Ishiguro ........................ | 362/37 |
| 2005/0135081 A1 | * | 6/2005 | Ishiguro ........................ | 362/37 |
| 2005/0243566 A1 | * | 11/2005 | Hasumi ........................ | 362/465 |

FOREIGN PATENT DOCUMENTS

JP 2003-159986 6/2003

* cited by examiner

*Primary Examiner*—John Anthony Ward
*Assistant Examiner*—David Makiya
(74) *Attorney, Agent, or Firm*—Fish & Richardson P.C.

(57) ABSTRACT

A vehicle lighting system comprising an additional illumination lamp for additionally illuminating ahead of a vehicle and a control means for controlling turn-on and turn-off of the additional illumination lamp so as to follow a steering angle at which the vehicle is steered. The control means sets a turn-on reference steering angle $\theta 2$ for turning on the additional illumination lamp based on the steering angle, a primary turn-off reference steering angle $\theta 1$ for turning off the additional illumination lamp at a steering angle which is smaller than the turn-on reference steering angle $\theta 2$ and a secondary turn-off reference steering angle $\theta 3$ for turning off the additional illumination lamp at a steering angle which is larger than the primary turn-off reference steering angle $\theta 1$ when the vehicle is steered to a predetermined steering angle which is larger than the turn-on reference steering angle $\theta 2$.

7 Claims, 8 Drawing Sheets

VEHICLE LIGHTING SYSTEM

The present application claims foreign priority based on Japanese Patent Application No. P.2004-070108, filed on Mar. 12, 2004, the contents of which are incorporated herein by reference.

BACKGROUND OF THE INVENTION

The present invention relates to a vehicle lighting system including an additional illumination lamp for additionally illuminating ahead of a vehicle such as an automobile when the vehicle runs on a curved road.

Figure 2A:
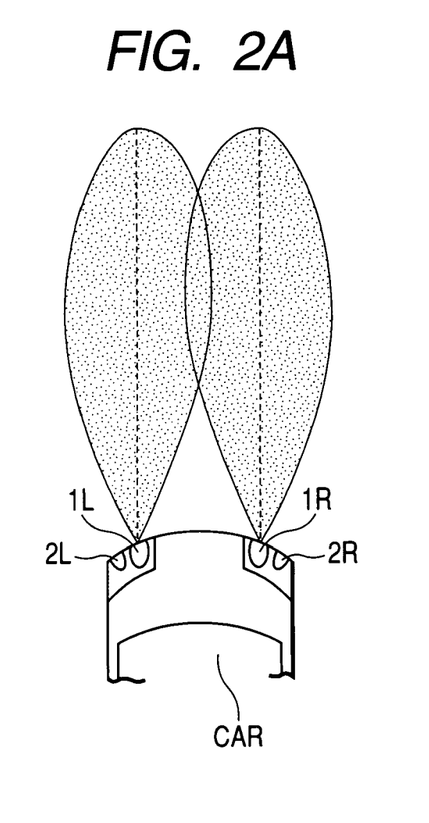
FIGS. 2A to 2C are diagrams illustrating light distribution properties of the automobile provided with additional illumination lamps.
Figure 2B:
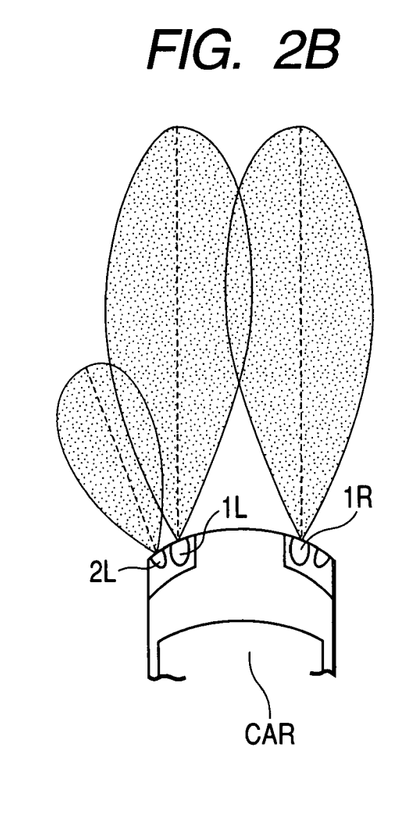
Figure 2C:
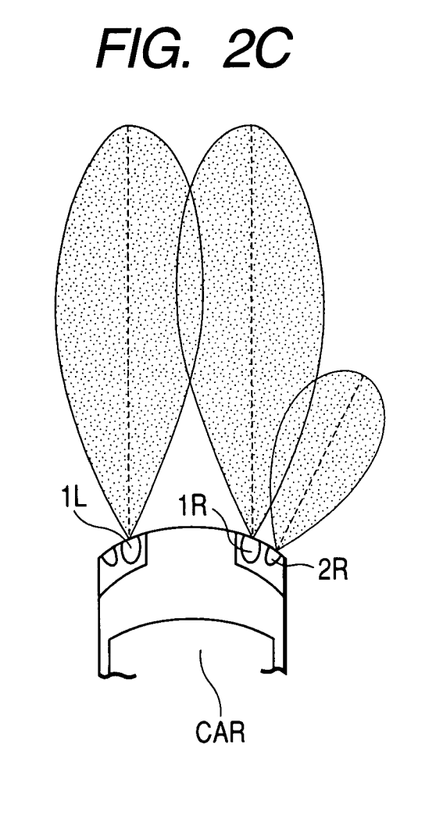

In order to increase the driving safety of automobiles, there have been proposed adaptive front-lighting systems (AFS) which adopt a form in which the illumination ranges of headlamps of an automobile are directed in a direction in which the automobile is steered or a form in which the illumination ranges of the headlamps are expanded as the automobile is steered on a curved road. In the AFS, according to the former form in which the illumination ranges are swiveled towards the direction in which the automobile is steered, while there can be provided an advantage that a preferable range is illuminated in accordance with the steering of the automobile, a mechanism for swiveling the headlamps is necessary, resulting in a complicated construction. On the other hand, in the latter form in which auxiliary lamps are provided as additional illumination lamps to main headlamps (main lamps), so that the auxiliary lamps are illuminated when the automobile is steered so as to expand the illumination range in the direction in which the automobile is steered, when either the left additional illumination lamp 2L or the right additional illumination lamp 2R is illuminated, the illumination range of the left or right additional illumination lamp which is so illuminated can, as shown in FIGS. 2B, 2C, be added to the illumination range resulting solely from the illumination of either the main lamp 1L of the left headlamp LL or the main lamp 1R of the right headlamp LR, as shown in FIG. 2A, so that the illumination range in the direction in which the automobile is steered can be thus expanded. In this form, while there is an advantage that the necessary construction can be attained simply and inexpensively since no driving mechanism needs to be additionally provided for the headlamps, the expansion of the illumination range when the automobile is steered is determined only to an area extending along the direction of an optical axis of the additional illumination lamp 2L or 2R.

In the lighting system having the additional illumination lamps like this, since the optical axis of the additional illumination lamp is determined to be fixed, conventionally, a construction is adopted in which the additional illumination lamp is not lit up when the automobile is steered at a smaller steering angle than a predetermined steering angle which is preset in accordance with the optical axis angle of the additional illumination lamp (an angle formed by the straight forward traveling direction of the automobile and the optical axis of the additional illumination lamp) but is lit up when the automobile is steered at a steering angle equal to or larger than the predetermined steering angle so as to additionally illuminate the direction in which the automobile is steered. In this construction, however, when the automobile is steered at a steering angle close to the predetermined steering angle, there occurs a phenomenon where only with a slight change in the steering angle, the additional illumination lamp is repeatedly turned on and off (hereinafter, when referred to in this specification, this phenomenon is referred to as illumination hunting), and this troubles the driver of the automobile, which is not desired in consideration of safety driving.

Figure 8A:
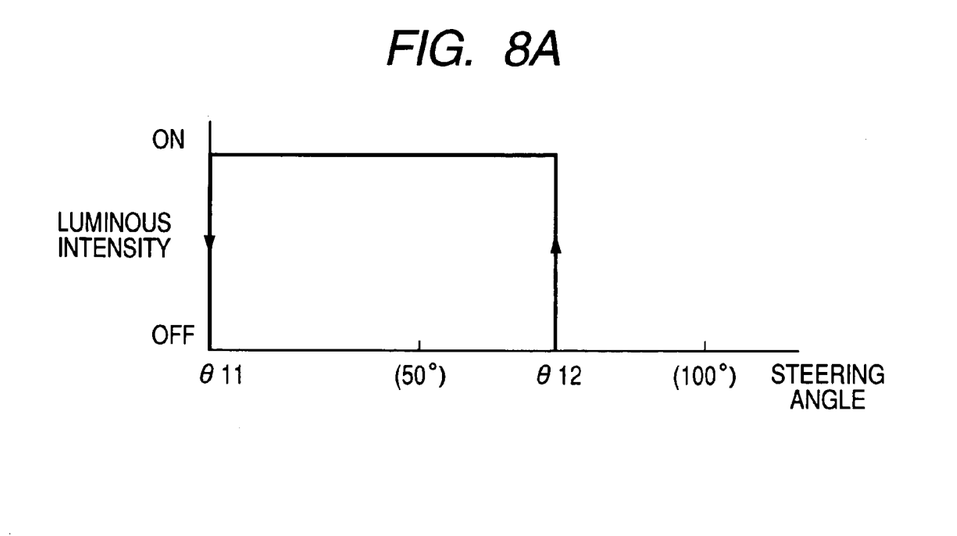
FIGS. 8A and 8B are diagrams illustrating turn-on and turn-off properties according to a conventional lighting system.

To cope with the problematic illumination hunting, according to JP-A-2003-159986, as shown in FIG. 8A, a steering angle at which an additional illumination lamp is turned on as a result of the increase in steering angle (a turn-on reference steering angle $\theta 12$) and a steering angle at which the additional illumination lamp is turned off as a result of the decrease in steering angle (a turn-off reference steering angle $\theta 11$) are set to different steering angle positions so as to impart a hysteresis to the turn-on/turn-off control of the additional illumination lamp, whereby the frequent repetition of turn-on and turn-off of the additional illumination lamp is prevented even in the event that the automobile is steered at the predetermined steering angle. Namely, in FIG. 8A, when the steering angle represented by the axis of abscissas exceeds the turn-on reference steering angle $\theta 12$, the additional illumination lamp is turned on, and thereafter, when the steering angle is decreased to become smaller than the turn-off reference steering angle $\theta 11$, the additional illumination lamp is turned off. Thus, by setting the turn-off reference steering angle $\theta 11$ to the steering angle which is deviated in the straight forward traveling direction (a steering angle of 0 degree) from the turn-on reference steering angle $\theta 12$, even in the event that the steering angle changes within an angle range resulting from the deviation of the turn-off reference steering angle $\theta 11$ from the turn-on reference steering angle $\theta 12$, there occurs no case where the additional illumination lamp, which is illuminated, is turned off, the illumination hunting being thus prevented.

While the lamp of JP-A-2003-159986 is effective in preventing the occurrence of the illumination hunting in the additional illumination lamps, since the turn-off reference steering angle $\theta 11$ is set to the steering angle (to the steering angle of 0 degree in JP-A-2003-159986) which is situated apart by a large angle relative to the turn-on reference steering angle $\theta 12$, even in a situation in which the automobile approaches an end of a curved road and is then steered back to the straight forward traveling direction or steered in an opposite direction to cope with an oppositely directed curved road, the additional illumination lamp is not turned off, and thus, the direction which is different from the direction in which the automobile is now traveling is still illuminated, causing the driver to feel a feeling of physical disorder or drawing the line of sight of the driver to the different still illuminated direction, which is not preferable in consideration of safety driving. In particular, when the automobile is driven on the curved roads at low speeds, almost all the curves are curves of a small radius of curvature or corners such as at intersections, and in this case, since the steering wheel is steered at a large steering angle, it takes a certain time to steer it back to the straight forward traveling direction, and the driver is forced to feel a feeling of physical disorder during the time.

Figure 8B:
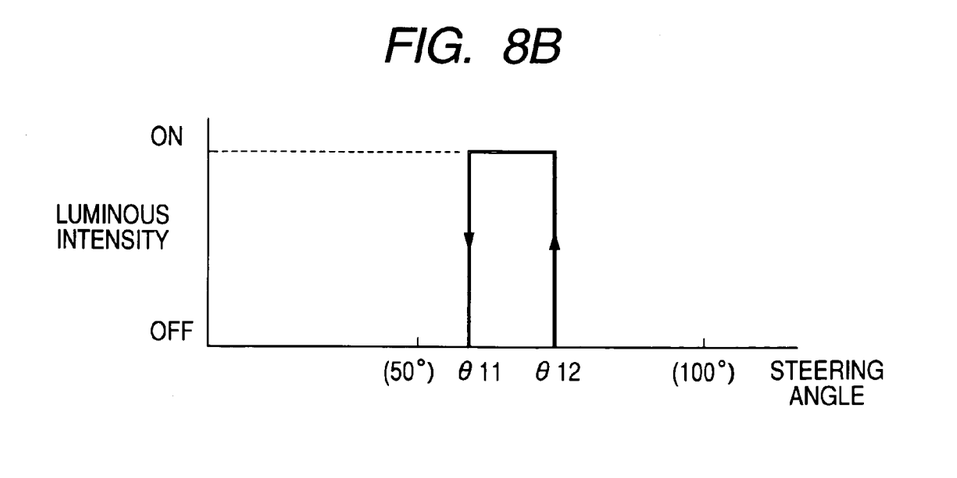

As to this point, as shown in FIG. 8B, while it may be considered possible to reduce the feeling of physical disorder that the driver has to feel by setting the turn-off reference steering angle $\theta 11$ to a steering angle position which is close to and is only slightly smaller than the turn-on reference steering angle $\theta 12$, in this case, it becomes difficult to set the turn-off reference steering angle $\theta 11$ appropriately. Namely, the setting of the turn-off reference steering angle $\theta 11$ at the steering angle position which is close to the turn-on reference steering angle $\theta 12$ is not good enough, since only with a change by a small steering angle in the steering angle, there is easily caused a situation in which the steering angle exceeds the turn-off reference steering angle θ11 or the turn-on reference steering angle θ12 in both the increasing and decreasing directions, and hence, the original object of ensuring the prevention of the occurrence of illumination hunting in the additional illumination lamps becomes difficult to be achieved. In addition, in JP-A-2003-159986, while the turn-on reference steering angle is changed in accordance with a change in vehicle speed of the automobile, it is difficult to solve the problem that the driver is forced to feel the feeling of physical disorder on the aforesaid occasions only with such a countermeasures.

SUMMARY OF THE INVENTION

An object of the invention is to provide a vehicle lighting system which can solve the problem that the driver is force to feel the feeling of physical disorder while ensuring the prevention of the illumination hunting.

According to embodiments of the invention, there is provided a vehicle lighting system including an additional illumination lamp for additionally illuminating ahead of a vehicle and a control means for controlling turn-on and turn-off of the additional illumination lamp by following a steering angle at which the vehicle is steered, wherein the control means sets as references for controlling the turn-on and turn-off of the additional illumination lamp: a turn-on reference steering angle for turning on the additional illumination lamp based on the steering angle; a primary turn-off reference steering angle for turning off the additional illumination lamp at a steering angle which is smaller than the turn-on reference steering angle; and a secondary turn-off reference steering angle for turning off the additional illumination lamp at a steering angle which is larger than the primary turn-off reference steering angle when the vehicle is steered to a predetermined steering angle which is larger than the turn-on reference steering angle.

According to the invention, by setting the turn-on reference steering angle and the primary turn-off reference steering angle at the different steering angles, a hysteresis is imparted to the turn-on and turn-off control of the additional illumination lamp, so that the illumination hunting occurring in the additional illumination lamp in association with the steering of the vehicle is prevented. In addition, when the vehicle is steered to the predetermined steering angle which is larger than the turn-on reference steering angle, by setting the secondary turn-off reference steering angle at which the additional illumination lamp is turned off when the vehicle is steered to a larger steering angle than the primary turn-off reference steering angle, the additional illumination lamp can be turned off without delay at the larger steering angle than the primary turn-off reference steering angle when the vehicle is steered to that large steering angle, thereby making it possible to solve the problem that the driver is force to feel the feeling of physical disorder due to the delay in turning off the relevant additional illumination lamp.

Further, according to the embodiments of the invention, the control means preferably includes a plurality of different maps in which the respective reference steering angles are set at different steering angles, so that the control means selects any of the plurality of maps based on running road conditions including vehicle speed information and navigator information of the vehicle, whereby the control means implements the control of turn-on and turn-off of the additional illumination lamp based on the map so selected. In addition, the control means preferably implements a control in which the luminous intensity of the additional illumination lamp changes in a gradual fashion, when turning on or turning off the additional illumination lamp.

DESCRIPTION OF THE PREFERRED EMBODIMENTS

Embodiments of the invention will be described by reference to the accompanying drawings.

<First Embodiment>

Figure 1A:
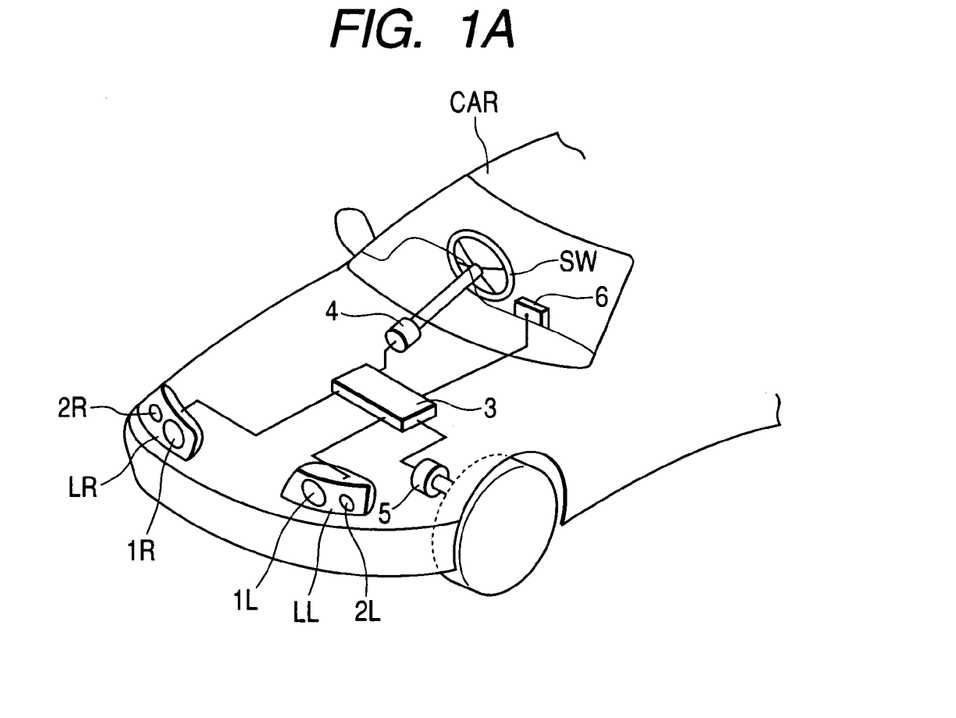
FIG. 1A is a conceptual drawing of an automobile to which a lighting system according to the invention is applied.

FIG. 1A is a schematic view of an automobile provided with additional illumination lamps. A left headlamp LL and a right headlamp RL are provided at front left and front right portions of an automobile CAR, respectively, and these headlamps LL, LR include, respectively, main lamps 1L, 1R which illuminate a straight forward traveling direction of the automobile and additional illumination lamps 2L, 2R as auxiliary lamps which illuminate, respectively, left forward and right forward areas of the automobile. As is seen from light distribution patterns shown in FIG. 2A, in the left and right headlamps LL, LR, optical axes of the respective main lamps 1L, 1R are directed in the straight ahead traveling direction of the automobile CAR, and a required range ahead of the straight forward traveling direction of the automobile CAR is illuminated by these main lamps 1L, 1R. In addition, as shown in FIG. 2B, an optical axis of the additional illumination lamp 2L of the left headlamp LL is inclined leftward by a required angle relative to the straight forward traveling direction of the automobile, so that when lit up, in addition to the illumination by the main lamps 1L, 1R in the straight forward traveling direction, the additional illumination lamp 2L illuminates a more leftward near-field area than the foreground illuminated by the main lamps 1L, 1R. In contrast, as shown in FIG. 2C, an optical axis of the additional illumination lamp 2R of the right headlamp LR is inclined rightward by a required angle relative to the straight forward traveling direction of the automobile, so that when lit up, in addition to the illumination by the main lamps 1L, 1R in the straight forward traveling direction, the additional illumination lamp 2R illuminates a more rightward near-field area than the foreground illuminated by the main lamps 1L, 1R.

Figure 1B:
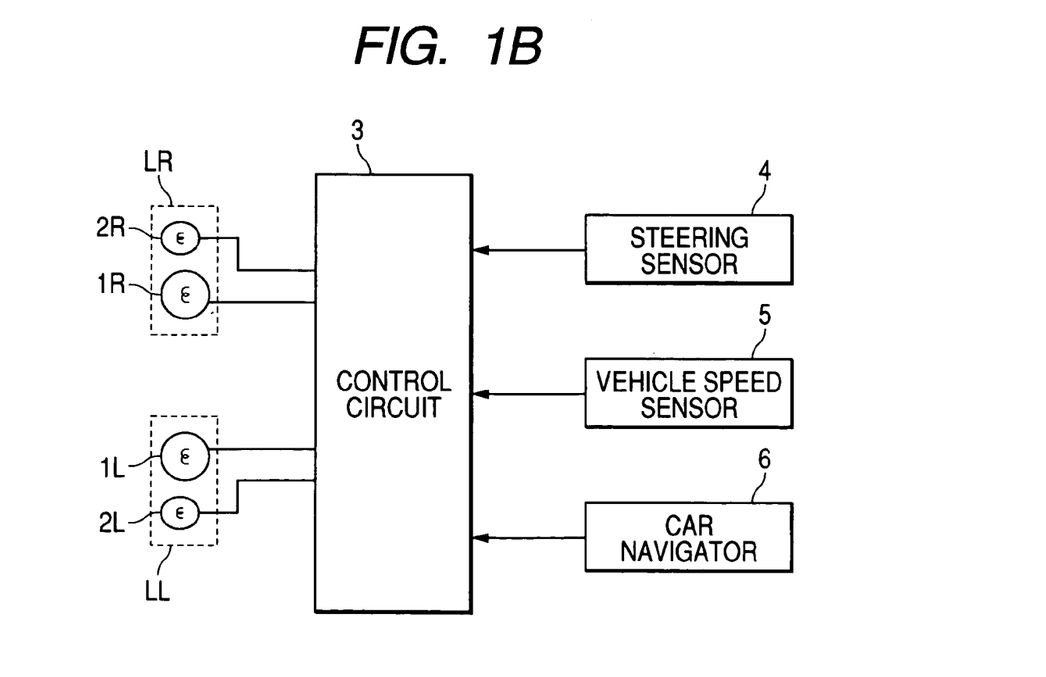
FIG. 1B is a block diagram of an electric system of the automobile.

FIG. 1B is a block diagram of an electric system for the headlamps LL, LR, and the illumination of the left and right headlamps LL, LR is designed to be controlled by a control circuit 3 (a controller 3). A steering angle sensor 4 for detecting a steering angle at which the automobile is steered through the operation of a steering wheel SW of the automobile CAR, a vehicle speed sensor 5 for detecting a vehicle speed of the automobile CAR and a car navigation system or car navigator 6, in case such a system is equipped on the automobile, are connected to the control circuit 3, respectively. A steering angle signal, which results from a steering angle detected by the steering angle sensor 4, is inputted into the control signal from the steering angle sensor 4, and a vehicle speed sensor, which results from a vehicle speed detected by the vehicle speed sensor 5, is inputted into the control circuit 3 from the vehicle speed sensor 5. In addition, a running condition signal indicating the conditions of a road ahead of the automobile CAR is inputted into the control circuit 3 from the car navigator 6.

According to the lighting system including the headlamps LL, LR which are constructed as has been described above, the main lamps 1L, 1R are illuminated by turning on a headlamp illumination switch, not shown, when the automobile CAR is driven. When the automobile CAR enters a curved road while being steered as required through the operation of the steering wheel SW, a steering angle signal is inputted into the control circuit 3 from the steering angle sensor 4, and the control circuit 3 illuminates based on the steering angle signal so inputted either the additional illumination lamp 2L of the left headlamp LL or the additional illumination lamp 2R of the right headlamp LR which exists on a side to which the automobile is steered, whereby the straight forward traveling direction and the direction in which the automobile is so steered are illuminated by the light distributions by the main lamps 1L, 1R, which are shown in FIG. 2A, and the light distribution of either the additional illumination lamp 2L or the additional illumination lamp 2R, and the driver is allowed to easily foresee the direction on the curved road the automobile is heading for. In addition, when the automobile approaches an end of the curved road and is then steered back to the straight forward traveling direction or to an opposite direction through the operation of the steering wheel SW, reaching a situation where the driver is caused to direct the line of sight thereof to the direction in which the automobile is being steered, the control circuit 3 turns off the additional illumination lamp 2L or 2R based on a steering angle signal from the steering angle sensor 4, whereby the driver is prevented from feeling the feeling of physical disorder.

Figure 3:
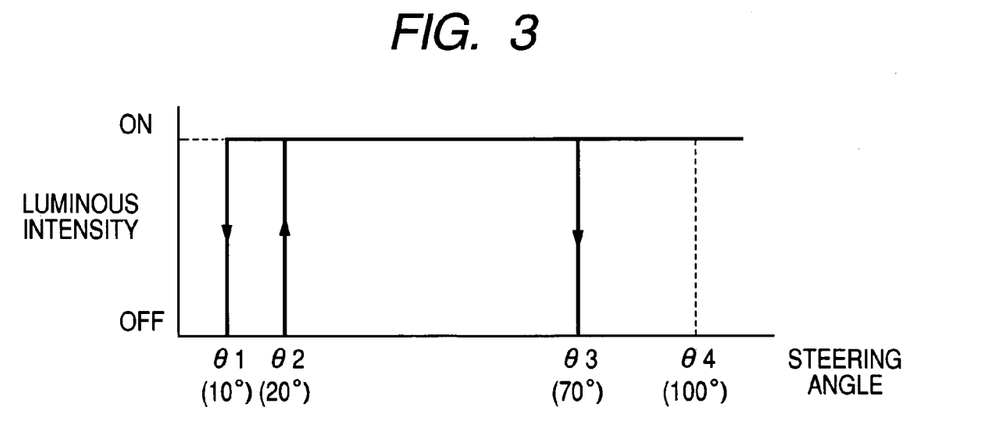
FIG. 3 is a diagram illustrating turn-on and turn-off properties according to a first embodiment.

FIG. 3 is a diagram which explains turn-on and turn-off operations of the additional illumination lamps 2L, 2R in association with the steering of the automobile according to a first embodiment. The axis of abscissas denotes steering angle and an angle of 0 degree denotes straight forward traveling direction. In addition, the axis of ordinates denotes illumination intensity of the additional illumination lamps 2L, 2R, and herein, ON denotes that the lamps are turned on, while OFF denotes that the lamps are turned off. Note that in the following description, the functions of the left and right additional illumination lamps 2L, 2R becomes identical. In the same drawing, a turn-on reference steering angle $\theta 2$ is set at a steering angle of 20 degrees, and a primary turn-off reference steering angle $\theta 1$ is set at a steering angle of 10 degrees, which is smaller than the turn-on reference steering angle $\theta 2$. Furthermore, a secondary turn-off reference steering angle $\theta 3$ is set at a steering angle of 70 degrees, which is larger than the turn-on reference steering angle $\theta 2$, and a secondary turn-off activating steering angle $\theta 4$ is set at a steering angle of 100 degrees, which is larger than the secondary turn-off reference steering angle $\theta 3$.

The turn-on reference steering angle $\theta 2$ is a steering angle which constitutes a reference for turning on the additional illumination lamp 2L or 2R of the headlamp of the left and right headlamps which is positioned on a side to which the automobile is steered when the automobile is steered to reach an steering angle which is equal to or larger than the turn-on reference steering angle $\theta 2$. In addition, the primary turn-off reference steering angle $\theta 1$ is a steering angle which constitutes a reference for turning off the additional illumination lamp 2L or 2R which is then illuminated when the automobile is steered to reach the steering angle which is equal to or larger than the turn-on reference steering angle $\theta 2$ to thereby illuminate the additional illumination lamp 2L or 2R and is thereafter steered to reduce the steering angle down to a steering angle which is smaller than the primary turn-off reference steering angle $\theta 1$. Furthermore, the secondary turn-off reference steering angle $\theta 3$ is a steering angle which constitutes a reference for turning off the additional illumination lamp 2L or 2R which is then illuminated when the automobile is steered to reach the steering angle which is equal to or larger than the turn-on reference steering angle $\theta 2$ to thereby illuminate the additional illumination lamp 2L or 2R, is furthermore steered to increase the steering angle to the secondary turn-off activating steering angle $\theta 4$ or larger and is thereafter steered to reduce the steering angle down to a steering angle which is smaller than the secondary turn-off reference steering angle $\theta 3$. Thus, there are provided properties in which the hysteresis is provided for the primary turn-off reference steering angle $\theta 1$ on the straight forward traveling direction side relative to the turn-on reference steering angle $\theta 2$, the secondary turn-off reference steering angle $\theta 3$ is set at the larger steering angle than the primary turn-off reference steering angle $\theta 1$, and the hysteresis is provided for the second turn-off activating steering angle $\theta 4$.

Figure 4:
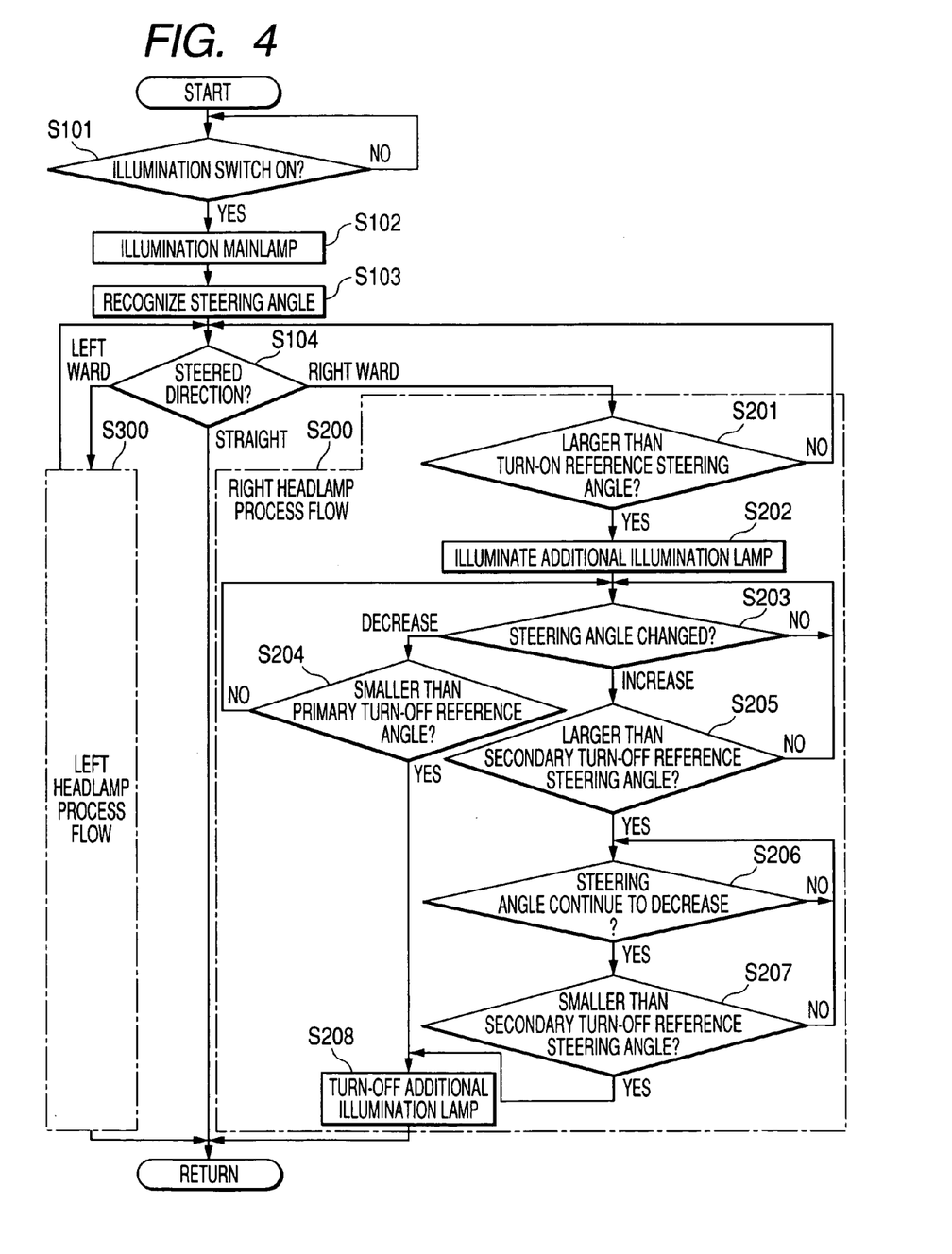
FIG. 4 is a flowchart which explains turn-on and turn-off operations according to the first embodiment.

FIG. 4 is a flowchart which explains the turn-on and turn-off operations of the headlamps based on the diagram shown in FIG. 3. Firstly, when the headlamp illumination switch is turned on (S101), the main lamps 1L, 1R of the respective left and right headlamps LL, LR are illuminated, and the straight forward traveling direction of the automobile is illuminated by the light distributions shown in FIG. 2A (S102). When the automobile reaches a situation where it is about to enter a curved road on the road and is then steered as required through the operation of the steering wheel, the control circuit 3 recognizes a steering angle from a steering angle signal sent from the steering angle sensor 4 (S103) The control circuit 3 determines a steering direction based on the steering angle so recognized (S104), if the steering direction is rightward, proceed to a right headlamp process flow S200, whereas if the steering direction is leftward, proceed to a left headlamp process flow S300. In addition, if the steering direction is straight, neither of the respective process flows is performed and then return simply.

In the right headlamp process flow S200, steering angles obtained from steering angle signals are monitored to be compared with the turn-on reference steering angle $\theta 2$ (S201), and when the steering angle reaches or exceeds the turn-on reference steering angle $\theta 2$, the additional illumination lamp 2R of the right headlamp LR is illuminated, whereby the illumination by the light distribution shown in FIG. 2c is implemented and in addition to the foreground in the straight forward traveling direction of the automobile, a diagonally rightward forward area thereof is illuminated (S202). Steering angles obtained from steering angle signals continue to be monitored after the additional illumination lamp 2R has been illuminated (S203), and when, thereafter, the steering angle continues to decrease lower than the turn-on reference steering angle $\theta 2$, steering angles so decreasing are compared with the primary turn-off reference steering angle $\theta 1$ (S204). Then, when the automobile approaches an end of the curved road and is steered back to the straight forward traveling direction, the steering angle becoming smaller than the primary turn-off reference steering angle $\theta 1$, the control circuit 3 turns off the additional illumination lamp 2R (S208), whereby the illumination is implemented only by the main lamps 1L, 1R, and the light distributions are returned to those shown in FIG. 2A, the driver being thereby prevented from being forced to feel the feeling of physical disorder which he or she would otherwise have to feel due to the continuation of illumination of the additional illumination lamp 2R.

On the other hand, in step S203, when the steering angle becomes much larger than the turn-on reference steering angle $\theta 2$, the control circuit 3 compares the then steering angle with the secondary turn-off activating steering angle $\theta 4$ (S205). Then, if the steering angle reaches or exceeds the secondary turn-off activating steering angle $\theta 4$, the control circuit 3 sets the reference steering angle for turning off the additional illumination lamp 2R at the secondary turn-off reference steering angle. Then, when the control circuit 3 confirms that the steering angle decreases (S206), the control circuit 3 compares decreasing steering angles with the secondary turn-off reference steering angle $\theta 3$ (S207), and when the steering angle becomes smaller than the secondary turn-off reference steering angle $\theta 3$, the control circuit 3 turns off the additional illumination lamp 2R which is then turned on (S208). Namely, when the automobile is running on the curved road in which the steering angle reaches or exceeds the secondary turn-off activating steering angle $\theta 4$, the additional illumination lamp 2R is turned off before the steering angle is returned to a steering angle larger than the turn-on reference steering angle $\theta 2$.

Note that since the left headlamp process flow S300 is the same as the right headlamp process flow S200, here, the illustration and description of the left headlamp process flow S300 will be omitted. Thus, when running on a curved road where the automobile is required to be steered at the steering angle smaller than the secondary turn-off activating steering angle $\theta 4$, the illumination hunting is prevented by the hysteresis provided between the turn-on reference steering angle $\theta 2$ and the primary turn-off reference steering angle $\theta 1$. On the other hand, since the primary turn-off reference steering angle is set not at 0 degree which denotes the straight forward traveling direction but at the angle as close to the turn-on reference steering angle $\theta 2$ as possible, the additional illumination lamp can be turned off without delay when the automobile is steered back to the straight forward traveling direction, whereby the driver is prevented from feeling the feeling of physical disorder that he or she would otherwise have to feel due to the continued illumination of the additional illumination lamp. Note that since a change in steering angle when the automobile is running on a curved road at intermediate or high speeds is smaller than that resulting when the automobile is running on a curved road at low speeds, by setting the hysteresis angle between the turn-on reference steering angle $\theta 2$ and the primary turn-off reference steering angle $\theta 1$ to an angle which corresponds to a change in steering angle which normally occurs when the automobile is running on a curved road at intermediate or high speeds, that is, normally, an angle which is slightly larger than an angle through which the steering angle changes when the automobile is so driven, the occurrence of illumination hunting at intermediate or high vehicle speeds can be prevented in an ensured fashion.

In addition, when the automobile is driven on curved roads at low speeds, while, in many cases, the driving conditions require the steering angle to be changed largely, almost all the curved roads are sharp curves of a small radius of curvature or corners such as at intersections, and as this occurs, in most cases, the automobile is steered such that the steering angle reaches or exceeds the secondary turn-off activating steering angle $\theta 4$. Due to this, in this case, the additional illumination lamp 2R can be turned off, without waiting until the automobile is steered such that the steering angle returns to the primary turn-off reference steering angle $\theta 1$, immediately the automobile is steered such that the steering angle returns to the secondary turn-off reference steering angle $\theta 3$, which is larger than the primary turn-off reference steering angle $\theta 1$, thereby making it possible to resolve the feeling of physical disorder that the driver would otherwise have to feel.

Figure 5:
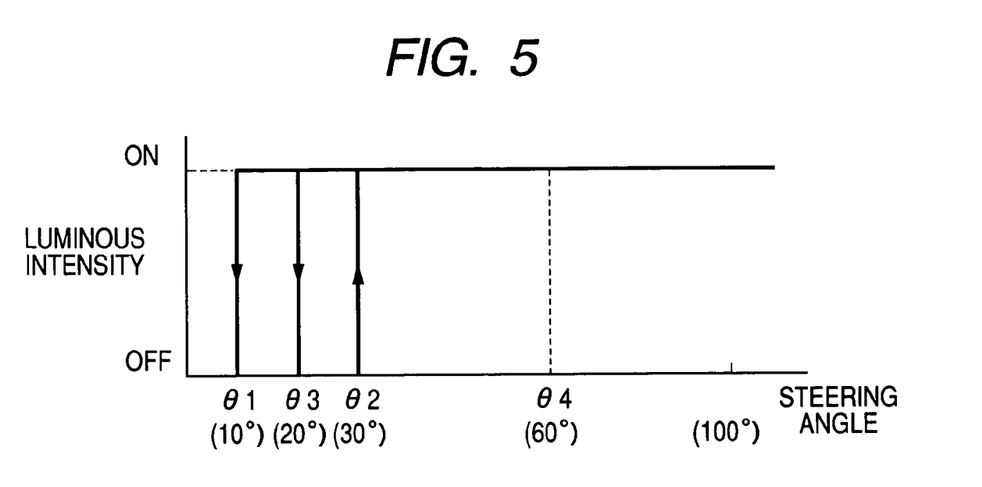
FIG. 5 is a diagram illustrating a modification to the first embodiment.

Here, in the first embodiment, while the secondary turn-off reference steering angle $\theta 3$ is set larger than the turn-on reference steering angle $\theta 2$, as is seen from a diagram shown in FIG. 5, in the event that the secondary turn-off activating steering angle $\theta 4$ is set at an angle which is smaller than that shown in FIG. 3, the secondary turn-off reference steering angle $\theta 3$ may be set to a steering angle which is larger than the primary turn-off reference steering angle $\theta 1$ at a steering angle position which is smaller than the turn-on reference steering angle $\theta 2$, that is, a steering angle between the turn-on reference steering angle $\theta 2$ and the primary turn-off reference steering angle $\theta 1$. In this case, when the steering angle is increased again after the additional illumination lamp is turned of as a result of the comparison of the steering angle with the secondary turn-off reference steering angle $\theta 3$, the additional illumination lamp can be turned on by comparing again the steering angle with the turn-on reference steering angle $\theta 2$. Note that it goes without saying that the secondary turn-off activating steering angle $\theta 4$ is set at a steering angle larger than the turn-on reference steering angle $\theta 2$.

<Second Embodiment>

Figure 6A:
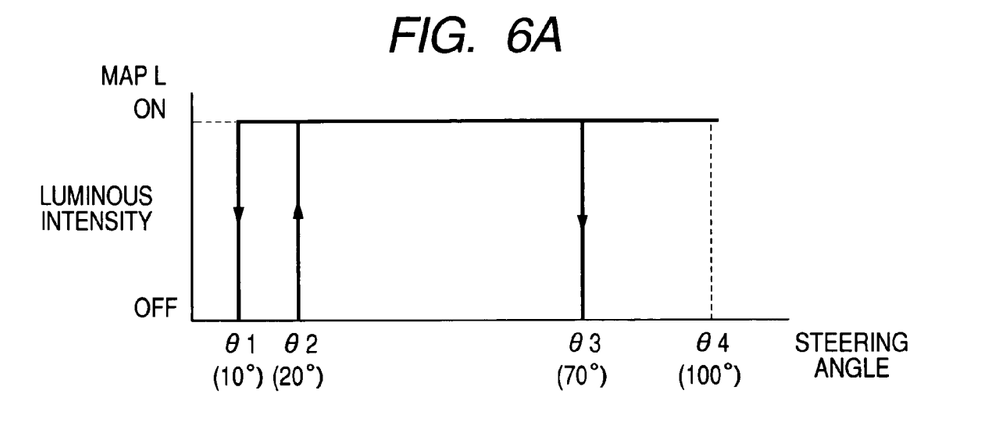
FIGS. 6A to 6C are diagrams illustrating turn-on and turn-off properties according to a second embodiment.
Figure 6B:
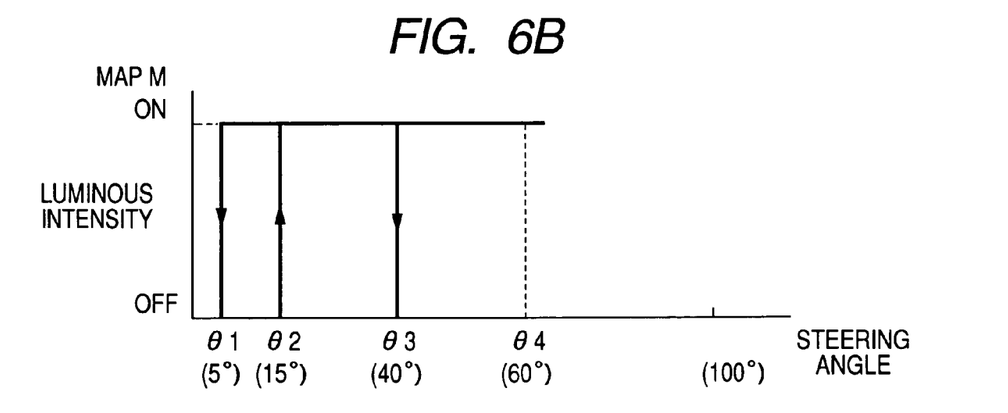
Figure 6C:
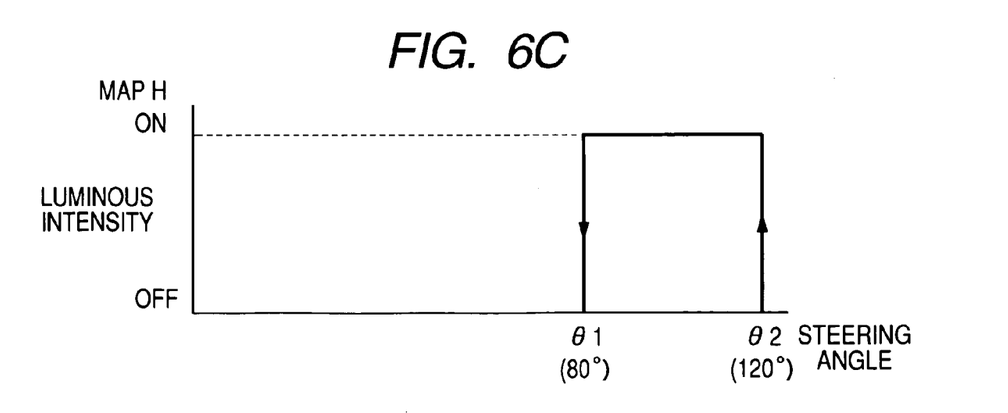

FIGS. 6A to 6C is diagrams which explain turn-on and turn-off operations of additional illumination lamps according to a second embodiment of the invention. Here, an example is illustrated in which the turn-on and turn-off of the additional illumination lamps is controlled depending on difference in vehicle speed, and different controls are designed to be implemented at low speeds (1 to slower than 15 km/h), intermediate speeds (15 to slower than 40 km/h) and high speeds (40 km/h and faster), respectively. As shown in the same diagrams, a map L denotes properties corresponding to the low speeds, a map M denotes properties corresponding to the intermediate speeds and a map H denotes properties corresponding to the high speeds, a control circuits implements required controls based on these three maps.

In the map L, the properties are set substantially similar to the first embodiment; a primary turn-off reference steering angle $\theta 1$ is set at 10 degrees, a turn-on reference steering angle $\theta 2$ at 25 degrees, a secondary turn-off reference steering angle $\theta 3$ at 70 degrees and a secondary turn-off activating steering angle $\theta 4$ at 100 degrees. In the map M, a primary turn-off reference steering angle $\theta 1$ is set at 5 degrees, a turn-on reference steering angle θ2 at 15 degrees, a secondary turn-off reference steering angle θ3 at 40 degrees and a secondary turn-off activating steering angle θ4 at 60 degrees. In the map H, a primary turn-off reference steering angle θ1 is set at 80 degrees, a turn-on reference steering angle θ2 at 120 degrees, and no angle is set for both a secondary turn-off reference steering angle θ3 and a secondary turn-off activating steering angle θ4.

In the second embodiment, the control circuit 3 selects any of the maps L, M, H based on vehicle speed information from a vehicle speed sensor 5. Alternatively, in this case, the control circuit 3 may be made to recognize running road information on a road where the automobile is about to run based on information from a navigation system or navigator 6, estimate a steering angle that is going to be used by the automobile from the recognized road information and select any of the maps L, M, H.

While since the control of the additional illumination lamps when the map L is selected while the automobile is running at low speeds is similar to that described in the first embodiment, the description thereof will be omitted here, by this control, the turn-on and turn-off of the additional illumination lamp 2L or 2R while the automobile is running on a curved road at low speeds is preferably controlled, whereby the illumination hunting can be prevented and the feeling of physical disorder that the driver would otherwise have to feel can be resolved. The control of the headlamps when the map M is selected while the automobile is running at intermediate speeds is basically the same as that at the low speeds. However, the turn-on reference steering angle θ2, the primary turn-off reference steering angle θ2, the secondary turn-off reference steering angle θ3 and the secondary turn-off activating steering angle θ4 are, as a whole, set to the smaller angles, respectively. This is because since, in many cases, curves on which the automobile is running at intermediate speeds are curves of larger radius of curvatures than those of curves on which the automobile is running at low speeds, the additional illumination lamp is turned on or turn off at relatively small steering angles when compared with the steering angles used at low speeds, so that the feeling of physical disorder that the driver would otherwise have to feel can be resolved effectively.

On the other hand, in the control of turn-on and turn-off of the additional illumination lamps when the map H is selected while the automobile is running at high speeds, curved roads on which the automobile is running at high speeds have extremely large radius of curvatures and hence steering angles are small, and the change in steering angle is also small. Due to this, there are less opportunities to illuminate the additional illumination lamp than when running at low and intermediate speeds, and hence there is almost no chance for the driver to be forced to feel the feeling of physical disorder due to the continued illumination of the additional illumination lamp. Consequently, neither the secondary turn-off reference steering angle θ3 nor the secondary turn-off activating steering angle θ4 is set. However, since there exists a chance for the additional illumination lamp to be turned on when the automobile is running at high speeds on a hairpin curve, to cope with such a case, the turn-on reference steering angle θ2 and the primary turn-off reference steering angle θ3 are set at the large steering angular positions. In this case, since the curve is sharp and hence the steering angle is decreased within a short period of time, there exists almost no case where the driver is forced to feel the feeling of physical disorder due to the illumination of the additional illumination lamp.

<Third Embodiment>

Figure 7A:
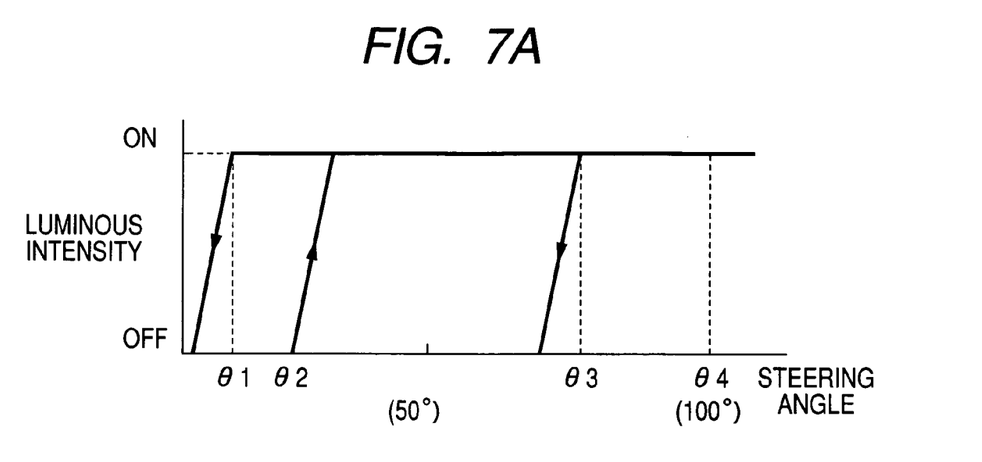
FIGS. 7A and 7B are diagrams illustrating turn-on and turn-off properties according to a third embodiment.
Figure 7B:
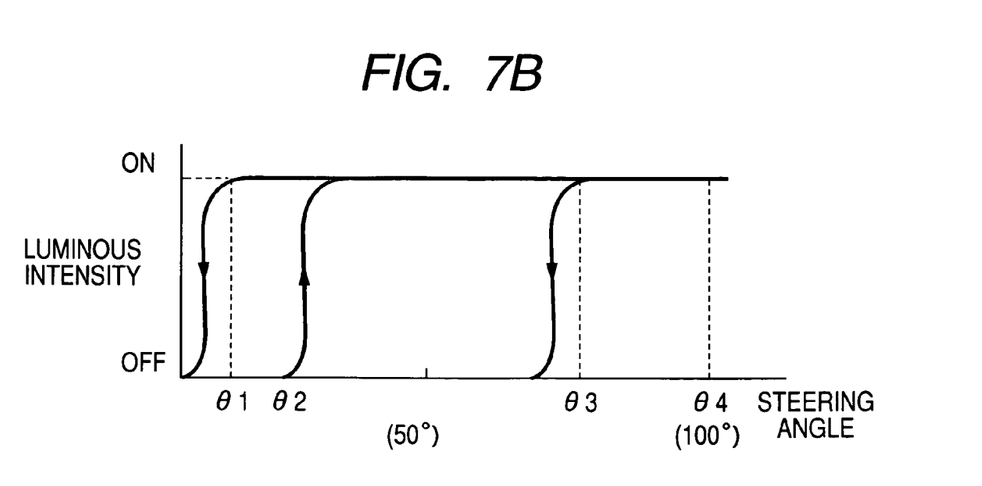

FIG. 7A is a diagram which explains turn-on and turn-off operations of additional illumination lamps according to a third embodiment of the invention, and in this embodiment, the luminous intensity of the additional illumination lamp is designed to be changed gradually when it is turned on and turned off as has been described in the first embodiment. Namely, in the first and the second embodiments, since, when turned on, the additional illumination lamps 2L, 2R are designed to be illuminated momentarily at a predetermined luminous intensity, whereas, when turned off, the additional illumination lamps 2L, 2R are designed to be turned off momentarily to an luminous intensity of 0cd, a difference in quantity of illuminating light between when turned on and when turned off is remarkable. In the third embodiment, in turning on and turning off the additional illumination lamps 2L, 2R, when turned on, the additional illumination lamps are controlled such that the luminous intensity thereof increases gradually, and when turned off, the additional illumination lamps are controlled such that the luminous intensity thereof decreases gradually, whereby the drastic change in quantity of illuminating light is prevented. By adopting this construction, a feeling of physical disorder that the driver would otherwise be forced to feel due to the drastic change in quantity of illuminating light can be resolved, and when entering a curved road, the running direction is gradually illuminated, whereas when approaching an end of the curved road, the illumination intensity is gradually decreased, whereby the eyes of the driver can effectively follow the change in brightness. Note that between when turned on and when turned off the luminous intensity may be made to change linearly as shown in FIG. 7A or change in a quadratic curve-like fashion as shown in FIG. 7B.

Here, while, in the respective embodiments, the example is described in which one additional illumination lamp is provided for each of the left and right headlamps, the similar control may be designed to take place also when two or more additional illumination lamps are provided for each of the left and right headlamps. In this case, by making turn-on reference steering angles and primary and secondary turn-off reference steering angles for the plurality of additional illumination lamps for each headlamp different from each other, respectively, the respective additional illumination lamps can be turned on and turned off sequentially in such a manner that one follows the other, and in this case, too, not only can the illumination hunting be prevented but also the feeling of physical disorder that the driver would otherwise have to feel can be resolved.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lighting system comprising:
   an additional illumination lamp for additionally illuminating ahead of a vehicle; and
   a controller for controlling turn-on and turn-off of the additional illumination lamp based on a steering angle at which the vehicle is steered,
   wherein the controller sets as references for controlling the turn-on and turn-off of the additional illumination lamp;

a turn-on reference steering angle for turning on the additional illumination lamp;

a primary turn-off reference steering angle for turning off the additional illumination lamp at a steering angle which is smaller than the turn-on reference steering angle; and a secondary turn-off reference steering angle for turning off the additional illumination lamp at a steering angle which is larger than the primary turn-off reference steering angle at a time subsequent to the vehicle having been steered to a predetermined steering angle which is larger than the turn-on reference steering angle and the secondary turn-off reference steering angle.

2. The vehicle lighting system according to claim 1, wherein the controller comprises a plurality of maps in which the turn-on reference steering angles, the primary turn-off reference steering angles and the secondary turn-off reference steering angles are respectively set, the controller selects one of the plurality of maps based on running road conditions including vehicle speed information, and the controller turns-on and turns-off the additional illumination lamp based on the one of the plurality of maps which is selected.

3. The vehicle lighting system according to claim 1, wherein the controller comprises a plurality of maps in which the turn-on reference steering angles, the primary turn-off reference steering angles and the secondary turn-off reference steering angles are respectively set, the controller selects one of the plurality of maps based on running road conditions including navigator information of the vehicle, and the controller turns-on and turns-off the additional illumination lamp based on the one of the plurality of maps which is selected.

4. The vehicle lighting system according to claim 1, wherein the controller gradually changes the luminous intensity of the additional illumination lamp, when turning on or turning off the additional illumination lamp.

5. The vehicle lighting system according to claim 2, wherein the controller gradually changes the luminous intensity of the additional illumination lamp, when turning on or turning off the additional illumination lamp.

6. The vehicle lighting system according to claim 3, wherein the controller gradually changes the luminous intensity of the additional illumination lamp, when turning on or turning off the additional illumination lamp.

7. A vehicle lighting system comprising:

an additional illumination lamp for additionally illuminating ahead of a vehicle; and a controller for controlling turn-on and turn-off of the additional illumination lamp based on a steering angle at which the vehicle is steered, wherein the controller turns-on the additional illumination lamp when the steering angle is at a turn-on reference steering angle, the controller turns-off the additional illumination lamp when the steering angle is at a primary turn-off reference steering angle which is smaller than the turn-on reference steering angle, and the controller turns-off the additional illumination lamp when the steering angle is at a secondary turn-off reference steering angle which is larger than the primary turn-off reference steering angle, after the steering angle exceeds a secondary turn-off activating steering angle which is larger than the turn-on reference steering angle and the secondary turn-off reference steering angle.

* * * * *